UNITED STATES PATENT OFFICE.

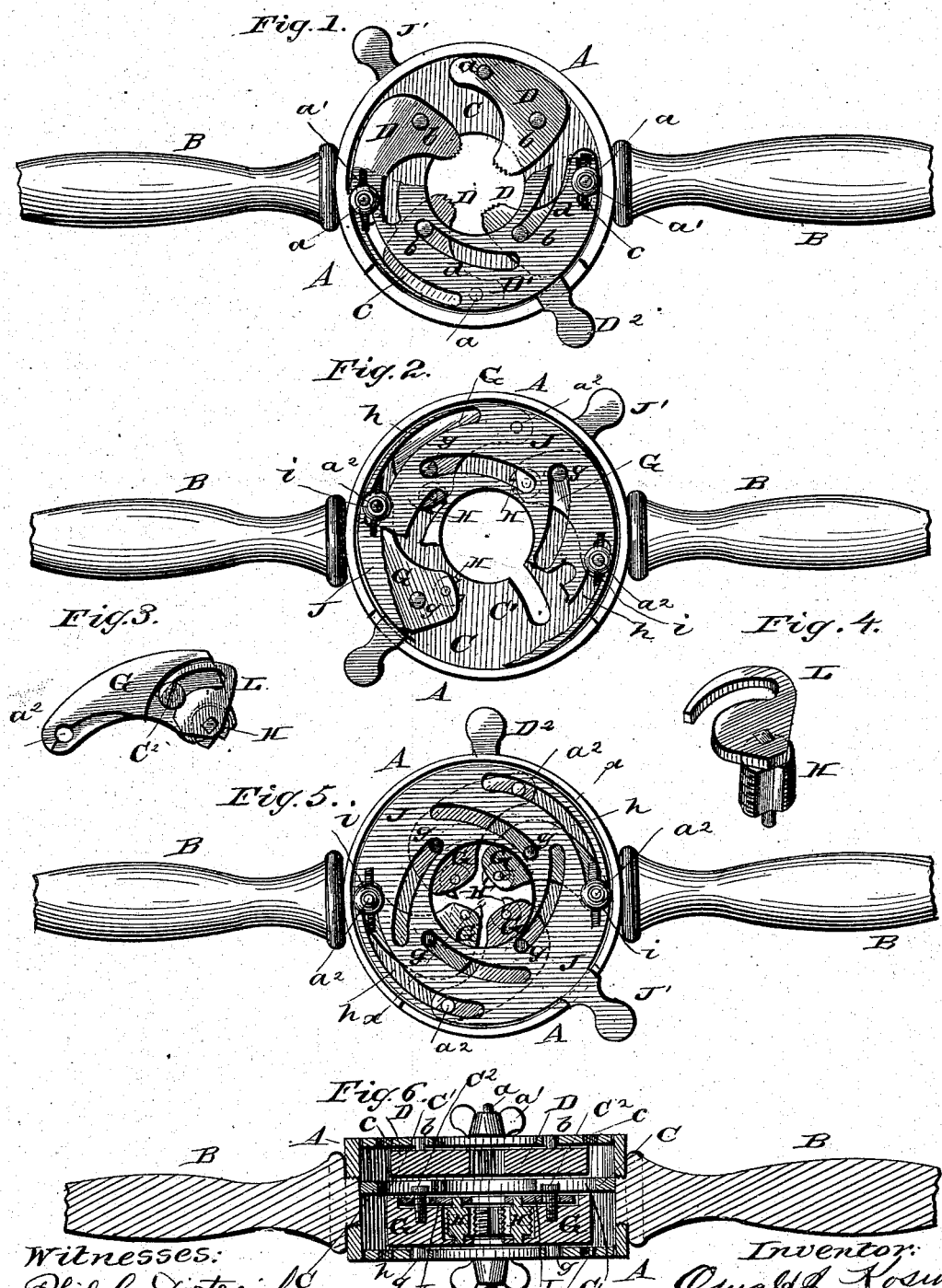

OSWALD J. KOSIOL, OF LOUISVILLE, KENTUCKY, ASSIGNOR TO HIMSELF AND LOUIS KOSIOL, OF SAME PLACE.

STOCK FOR CUTTING SCREW-THREADS.

SPECIFICATION forming part of Letters Patent No. 289,275, dated November 27, 1883.

Application filed June 29, 1883. (No model.)

*To all whom it may concern:*

Be it known that I, OSWALD J. KOSIOL, of Louisville, in the county of Jefferson and State of Kentucky, have invented certain new and useful Improvements in Stocks for Cutting Screw-Threads; and I do hereby declare that the following is a full, clear, and exact description thereof, reference being had to the accompanying drawings, and to the letters of reference marked thereon, which form part of this specification, in which—

Figure 1 represents one side of my stock, showing one-half of the face-plate broken away and the guiding-jaws on one side of the diaphragm of the stock-case. Fig. 2 is a view of the opposite side of the stock, showing portions of the dogs and their screw-thread cutters applied to them. Fig. 3 shows in detail one of the dogs and its screw-thread cutter. Fig. 4 shows in detail one of the jaws and its adjustable slotted segment. Fig. 5 is a side view of the stock, its slotted face-plate, and (by the aid of dotted lines) all of the dogs and their screw-thread cutters are shown. Fig. 6 is a diametrical section through line $x$ $x$ on Fig. 5.

This invention relates to hand-stocks which are adapted for cutting screw-threads on bolts; and it consists in a center stock having a case which is centrally divided by a slotted diaphragm, and provided with devices which will center a shaft and cut a screw-thread thereon, as will be hereinafter fully understood from the following description when taken in connection with the annexed drawings.

A designates a case, which is preferably cylindrical and provided with handles B B. This case is divided by a diaphragm, C, which has a perforation centrally through it, from which perforation radiate curved slots C', adapted to receive the heads of screws $C^2$. On one side of said diaphragm I apply the pivotal dogs D, which are designed for guiding a round bar. Each one of the dogs D has a convex back corresponding in radius to the internal diameter of the head A. Each dog is also constructed with a gripping-nose adapted to guide a cylindrical rod. Each dog is pivoted to a post, $a$, which is equidistant from its adjacent post, and all of the posts $a$ are equidistant from the center of the stock-head A. The dogs D are all provided with studs $b$, which are equidistant from their respective posts $a$. The inner edges of the dogs are concave, so that they will have free vibration without interfering one with another. Two of the posts $a$ $a$, which are diametrically opposite each other, are screw-threaded and made long enough to pass through slots $c$ $c$, made concentrically through a face-plate, D', which is provided with a handle, $D^2$. The face-plate D' has a large opening centrally through it, outside of which are curved tangential slots $d$, in which are received the studs $b$ of the dogs D. I have shown four guiding-dogs, all of which are moved simultaneously by adjusting the face-plate D' about the axis of the stock-head A. By these means a rod of metal is centered precisely as it would be if properly chucked in a lathe.

The screw-threaded studs $a$ $a$ are provided with thumb-nuts $a'$ $a'$, for the purpose of clamping the face-plate D' against all of the guiding-dogs and thus holding them at any desired point of adjustment. By simply loosening the nuts $a'$ $a'$ the face-plate is allowed to be moved about its axis, for the purpose of adjusting the guiding ends of the said dogs to different diameters of bolt-rods. On the opposite side of the diaphragm C, I apply dogs G, which are pivoted to studs $a^2$, directly opposite the studs $a$, and which are provided with short studs $g$, that enter freely tangential slots through a face-plate, J, having a handle, J'. This plate J also receives, through its concentric slots $h$ $h$, two of the pins $a^2$, which have screw-threads on them, and which receive thumb-nuts $i$ $i$, for the purpose of binding and firmly holding the slotted face-plate J when it is properly adjusted. The nose or inner portion of each dog G is recessed, and in the recess is received a screw-thread cutting-bit, H, which is a screw-cylinder having a score cut through its circumference, so that it presents cutting-edges adapted to form screw-threads in a bar or rod of metal, which is chucked in the stock and guided by the guiding-dogs above explained. Each cutting-die H is fitted into a socket in its respective dog G, and it is adjustable about its own axis by means of a slotted segment, L, and a binding-screw, $C^2$, the head of which is allowed to move in a slot provided for it in the diaphragm C of the stock A. By loosening the screw of each slotted segment the cutting-die thereof can be adjusted about its own axis, and by removing the screw and segment of each die the latter can be taken out of its socket or recess and sharpened or a new die can be substituted.

It will be observed that the guiding-dogs D merely travel around the object to be threaded in order to keep it properly centered.

Having described my invention, what I claim as new, and desire to secure by Letters Patent, is—

1. The combination, in a screw-thread cutter, of a stock which is provided with handles and a diaphragm which is centrally perforated, pivoted guiding-dogs on one side of said diaphragm and pivoted dogs on the opposite side thereof, having screw-thread cutting-dies applied to them, all constructed and adapted to operate substantially in the manner and for the purposes described.

2. The combination of the hollow stock A, the centrally-perforate diaphragm thereof, the guiding-dogs and their slotted actuating-plate, the die-cutters applied to the dogs on the opposite side of said diaphragm, and the slotted adjustable actuating-plate therefor, all constructed and adapted to operate substantially in the manner and for the purposes described.

3. The combination of the adjustable segments, the screw-thread cutting-dies, the set-screws for the said segments, the recessed pivoted dogs bearing the said dies, the slotted face-plate, adjustable as described, the head receiving said parts, and gripping-dogs, all constructed and adapted to operate substantially in the manner and for the purpose described.

4. In a screw-thread cutting-stock, the combination of pivoted dogs having screw-thread cutting-dies adjustably applied to them, an adjustable tangentially and concentrically slotted face-plate therefor, and adjustable guiding-dogs, all constructed and adapted to operate substantially in the manner and for the purposes described.

5. The head or frame A, having a central perforated diaphragm, slotted as described, and cast entire, in combination with guiding devices on one side of said diaphragm and pivoted screw-cutting devices on the opposite side of said diaphragm, substantially as described.

In testimony that I claim the foregoing as my own I affix my signature in presence of two witnesses.

OSW. J. KOSIOL.

Witnesses:
 GEO. E. PARKER,
 W. G. BAIRD.